United States Patent [19]
Zimmerman et al.

[11] Patent Number: 5,636,029
[45] Date of Patent: Jun. 3, 1997

[54] ELLIPTICAL LASER PROBE FOR SHADOW MASK

[75] Inventors: Bruce H. Zimmerman, Homer, N.Y.; James R. Fendley, Arlington Heights, Ill.

[73] Assignee: BMC Industries, Inc., Minneapolis, Minn.

[21] Appl. No.: 505,071

[22] Filed: Jul. 21, 1995

[51] Int. Cl.$^6$ .......................... G01B 11/02; G01B 11/04; G01B 11/08; G01B 11/10

[52] U.S. Cl. .......................... 356/384; 356/385; 356/386; 250/559.19; 250/559.24

[58] Field of Search .................................. 356/384, 385, 356/386, 237, 430; 250/559.12, 559.13, 559.19, 559.24, 559.42

[56] References Cited

U.S. PATENT DOCUMENTS

| | | |
|---|---|---|
| 3,954,337 | 5/1976 | Ragland, Jr. . |
| 4,330,775 | 5/1982 | Iwamoto et al. . |
| 4,930,889 | 6/1990 | Van Donselaar et al. ............. 356/237 |

FOREIGN PATENT DOCUMENTS

| | | |
|---|---|---|
| 54-124754A | 9/1979 | Japan . |
| 55-024365 | 2/1980 | Japan . |
| 58-147120 | 9/1983 | Japan . |
| 01143334 | 6/1989 | Japan . |

*Primary Examiner*—Frank G. Font
*Assistant Examiner*—Amanda Merlino
*Attorney, Agent, or Firm*—Kinney & Lange, P.A.

[57] ABSTRACT

A laser probe for measuring apertures in a sheet of material has a laser beam and a detection system. The laser beam has a major axis and a minor axis which are orthogonal to each other. The major axis is much larger than the minor axis. The dimensions of the apertures are determined from the fraction of the laser beam which passes through the sheet of material. Slot widths are measured by identifying relatively constant amounts of light passing through the sheet as the sheet moves relative to the laser beam.

21 Claims, 8 Drawing Sheets

ELLIPTICAL LASER PROBE FOR SHADOW MASK

BACKGROUND OF THE INVENTION

This invention relates to measuring the size of apertures in a material having an array of similarly sized apertures. Specifically, it relates to measuring the size of apertures in shadow masks for cathode-ray tubes.

Shadow masks are used in color display tubes to insure correct color reproduction of objects at the cathodoluminescent screen. One type of shadow mask is made of a thin metal sheet with substantially parallel columns of slots cut into it. The slots are separated within a column by a tie bar and typically have a rectangular shape with rounded ends. Adjoining columns of slots are offset from each other such that the center of the slot in one column is aligned with the center of the tie bar of the adjoining columns. Other shadow masks have other aperture shapes including: complete column apertures similar to the columns of slots except without the tie bars; and circular apertures arranged in columns and rows across the sheet of material.

To insure proper shadow mask quality, a number of techniques have been developed to measure the dimensions of these various apertures. In most methods, the apertures are measured by projecting a beam of light towards one side of the shadow mask and studying the transmitted light on the other side. In the prior art, the laser beam has always had a circular cross-section where it intersects the shadow mask. In some methods, this circular laser beam is made large enough to cover several apertures. Because the beam is so large, only average dimensions for large sections of the apertures can be attained from such systems. The large beam does not provide any detailed information about particular regions of a given aperture.

Another method uses a circular beam that is smaller than the smallest measurable dimension of a given aperture. This small beam is swept over the shadow mask in one direction as the shadow mask moves in a transverse direction. As the laser spot traverses the shadow mask, light sensors on the opposite side of the shadow mask measure the intensity of the transmitted light. In order to calculate a dimension of the aperture, this method divides the shadow mask into square segments with a plurality of square segments assigned to each aperture. To scan an entire aperture, the small beam must traverse the aperture several times while the mask moves in the transverse direction. After scanning a large block of square segments, the dimensions of each aperture can be determined by comparing the relative intensities of each square segment. This system requires both a large amount of memory to track the intensity at each square segment and the ability to uniformly scan the shadow mask.

SUMMARY OF THE INVENTION

The present invention is a laser probe system for measuring apertures in a sheet of material. The system uses a laser beam with a large major axis and a very small minor axis to illuminate a portion of the sheet. The amount of light transmitted through the sheet is indicative of the size of the apertures.

The present invention is well suited for measuring the dimensions of apertures in shadow masks. The elliptical shape provides more refined measurements than large circular beams which cover the entire aperture because the minor axis of the elliptical beam covers only a portion of the aperture at a time. In addition, since the major axis of the elliptical laser beam crosses several apertures, the beam does not have to be scanned across the sheet like small circular beams.

The elliptical shape allows for the measurement of the diameter of circular apertures, the width of column apertures and at least three different measurements of slot apertures: the slot width near the ends of the slots; the slot width at the centers of the slots; and the average light transmittance.

The measurement of the slot width near the ends of the slots is performed by identifying the maximum intensity level of the transmitted light. This maximum occurs when the elliptical beam is incident on full slots in each column of slots within its major axis. At the maximum, no part of the elliptical laser beam is incident on a rounded slot end or a tie bar. With the present invention, the intensity level of the beam remains constant at the maximum for a substantial period of time as the sheet moves through the laser beam. This constant intensity level results from the small minor axis of the beam crossing a relatively long distance where it does not encounter a rounded slot end. Dividing this constant level of intensity by the total intensity and multiplying the result by the distance between the centers of adjoining columns gives the average width of the illuminated slots near the ends.

The measurement of the slot width at the centers of the slots is similar to the measurement near the ends except that at the centers only the slots in every other column are illuminated. Between the columns of illuminated slots, the elliptical beam illuminates the tie bar. As with the end measurement, the minor axis of the beam is so small that there is an area on the sheet where the beam does not intersect the rounded ends of any of the slots. As the sheet moves, this area creates a constant minimum in the intensity level of the transmitted light. Dividing this constant minimum level by the total intensity of the incident light and multiplying the result by twice the distance between the centers of adjoining columns gives the average width of the illuminated slots at their centers.

DETAILED DESCRIPTION OF THE PREFERRED EMBODIMENTS

Figure 1:
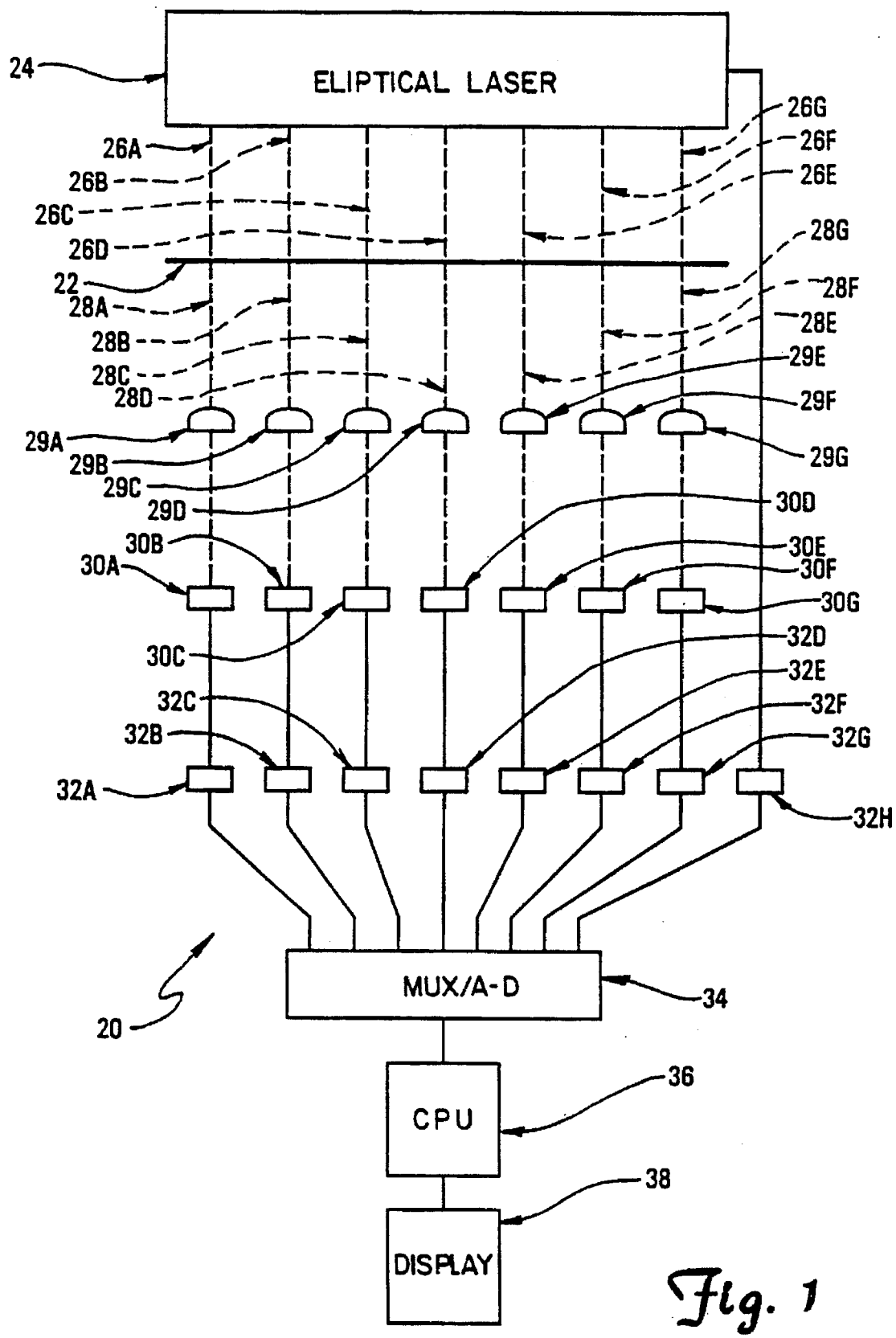
FIG. 1 is an exploded block diagram of the laser probe of the present invention.

FIG. 1 is an exploded block diagram of elliptical laser probe 20 and shadow mask 22 of the present invention. Elliptical laser 24 produces a number of elliptical laser beams 26A, 26B, 26C, 26D, 26E, 26F, and 26G. Elliptical laser beams 26A through 26G are incident on shadow mask 22 and portions of the beams pass through apertures (not shown) in shadow mask 22 forming transmitted beams 28A, 28B, 28C, 28D, 28E, 28F, and 28G respectively. In practice, shadow mask 22 moves transverse to the direction of propagation of elliptical laser beams 26A through 26G. For certain types of shadow masks, this movement causes transmitted beams 28A through 28G to vary as apertures in the shadow mask move through elliptical laser beams 26A through 26G respectively.

Transmitted beams 28A through 28G are directed towards photocells 30A, 30B, 30C, 30D, 30E, 30F, and 30G by cylindrical lenses 29A, 29B, 29C, 29D, 29E, 29F, and 29G respectively. When light from transmitted beams 28A through 28G is absorbed by the photocells it causes each photocell to produce an electric current that correlates to the amount of light it absorbs.

Photocells 30A through 30G are individually coupled to trans-impedance amplifiers 32A, 32B, 32C, 32D, 32E, 32F, and 32G respectively, which convert the current produced by the photocells into a voltage. In addition, trans-impedance amplifier 32H is coupled to a photocell located within elliptical laser 24. This photocell, which is described further below, absorbs light from a reference laser beam which has substantially the same intensity as each elliptical laser beam 26A through 26G incident on shadow mask 22. Thus, the current from this photocell is a reference current indicative of the intensity of each laser beam incident on shadow mask 22. Trans-impedance amplifier 32H converts this reference current into a reference voltage.

The outputs from trans-impedance amplifiers 32A through 32H are input to a multi-port multiplexer/analog-to-digital convertor 34. Multiplexer/convertor 34 multiplexes each analog voltage signal from trans-impedance amplifiers 32A through 32H onto a single line and then converts the multiplexed analog signals into a series of twelve-bit digital words. In a preferred embodiment, multiplexer/converter 34 samples each analog signal 12,000 times per second and converts each such sample to a twelve-bit digital word. Multiplexer/convertor 34 places the series of twelve-bit digital words created by the sampling and conversion of the analog signals on a twelve bit output line connected to a central processing unit (CPU) 36.

The series of digital samples is composed of sets of eight digital samples. Each set of eight contains one sample from the reference photocell and one sample from each of the other photocells 30A through 30G. For each set of eight samples, CPU 36 compensates the values from photocells 30A through 30G using the reference value from the reference photocell and a calibration factor stored in CPU 36 for each photocell 30A through 30G. The reference value is used to adjust the samples from photocells 30A through 30G to compensate for fluctuations in the intensity of laser beams 26A through 26G respectively. Variations in the intensity of these incident beams cause variations in the intensity of transmitted beams 28A through 28G which are not the result of changes in the shadow mask. To eliminate these unwanted variations, the intensities of the incident beams are tracked using the reference values from the reference photocell. The samples are then compensated to account for the fluctuations in the incident beams' intensities.

The calibration factor added by CPU 36 compensates for differences between the photocells. The calibration factor for each photocell 30A through 30G is determined during a calibration stage when laser probe system 20 is moved relative to shadow mask 22 so that shadow mask 22 is no longer between elliptical laser beams 26A through 26G and photocells 30A through 30G respectively.

During the calibration stage, photocells 30A through 30G create calibration currents in response to being illuminated by elliptical laser beams 26A through 26G, and the reference photocell creates a reference current in response to being illuminated by the reference laser beam. Trans-impedance amplifiers 32A through 32G then produce calibration voltages in response to the calibration currents. These calibration voltages are stored by CPU 36 and later compared with the reference voltage from trans-impedance amplifier 32H. Based on these comparisons, CPU 36 creates a calibration factor for each photocell 30A through 30G that adjusts the voltage value from each trans-impedance amplifier 32A through 32G so that the adjusted voltage values match the reference voltage value from trans-impedance amplifier 32H. Thus, the calibration factor compensates the voltage values to correct for differences between the values which are not caused by the shadow mask or fluctuations in the intensities of the incident beams. For optimum operation, the photocells should be calibrated on a regular basis.

After compensating each sample, CPU 36 stores the compensated samples in a memory. CPU 36 then uses some of these stored samples to determine characteristics of some of the apertures in shadow mask 22 which passed through elliptical laser beams 26A through 26G. Separate aperture characteristics may be determined for each set of apertures associated with a particular elliptical laser beam 26A through 26G. Information about the apertures' characteristics is transmitted to display 38 which may be a cathodoluminescent display or a print-out display. The display is used by an operator to verify that the shadow mask is being properly manufactured.

Figure 2:
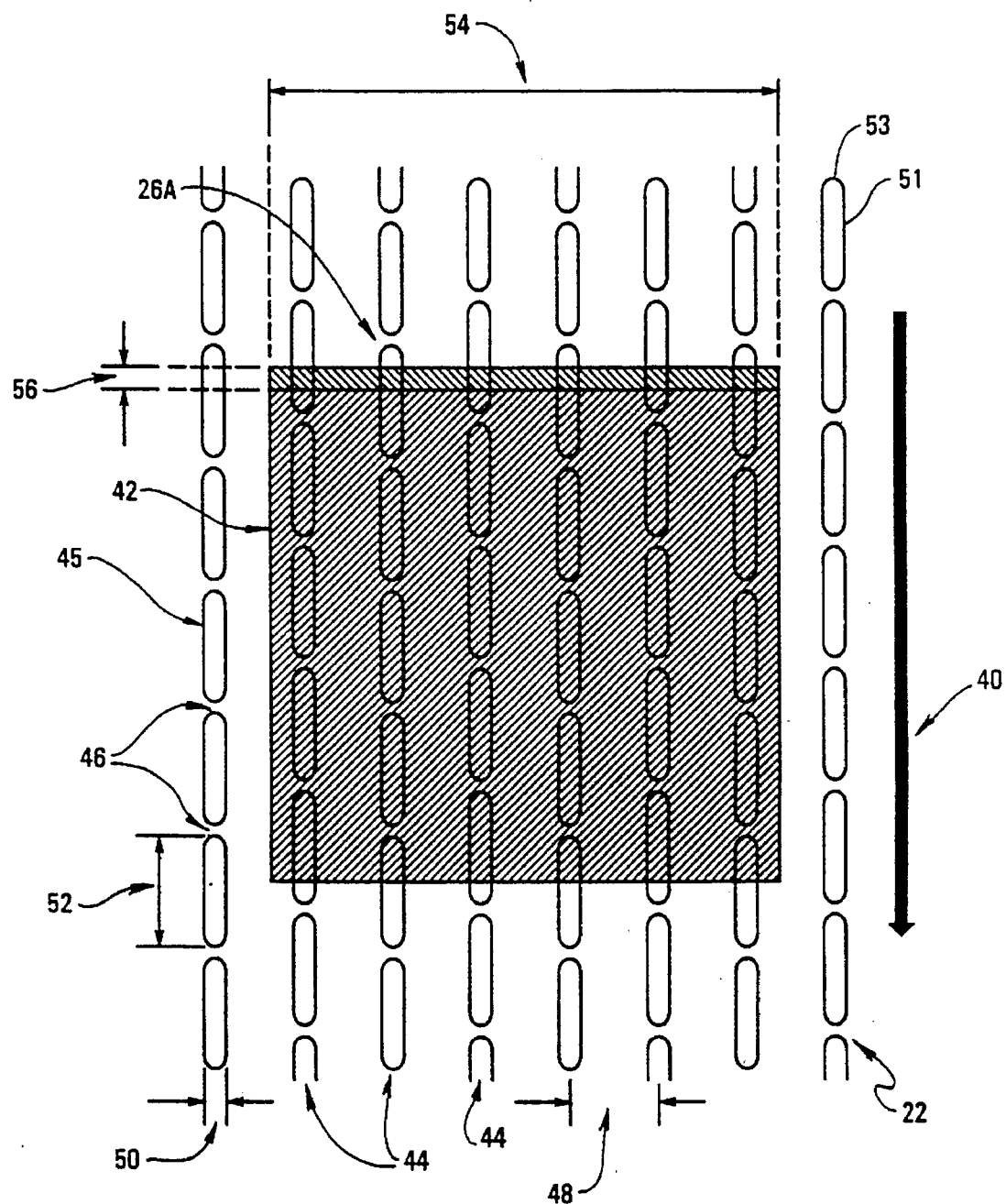
FIG. 2 is a small region of a typical shadow mask showing the band of illumination created by the elliptical laser beam.

FIG. 2 is a top view of a small portion of one type of shadow mask 22 which shows a cross section of incident elliptical laser beam 26A. Shadow mask 22 contains alternating offset columns 44 of slots 45. Within each column, the slots are separated from each other by tie bars 46. Offset columns 44 are separated by horizontal pitch 48 which is a distance measured from the center of one column to the center of the next adjoining column. Each slot 45 in the shadow mask has a slot width 50 and a slot length 52 as well as a center 51 and rounded ends 53.

Elliptical laser beam 26A illuminates an area on the shadow mask with a major axis 54 in the direction of slot width 50 and a minor axis 56 in the direction of slot length 52. The beam has an intensity distribution that approximates a Gaussian distribution along both axes. Thus, the center of elliptical laser beam 26A is the brightest part of the beam and the ends of both the major axis and the minor axis are the darkest. Major axis 54 covers six offset columns 44 while minor axis 56 covers only a portion of slot length 52. In addition, shadow mask 22 moves relative to elliptical laser beam 26A in the direction of minor axis 56 and slot lengths 52. The direction of movement of shadow mask 22 is shown as arrow 40 in FIG. 2. The portion of shadow mask 22 which passed through elliptical laser beam 26A forms an illuminated area 42 on shadow mask 22.

Although expanded in FIG. 2, minor axis 56 typically has a length of 50 microns which is much smaller than the length of tie bars 46. Because of minor axis 56's size, elliptical laser beam 26A illuminates only a small portion of slot length 52 at one time. As discussed further below, this small illumination area allows for more detailed analysis of the slot width 50. With elliptical laser beam 26A, slot width 50 may be measured near slot ends 53 and slot centers 51. In addition, by integrating the amount of light transmitted through illuminated area 42, the average light transmittance for a number of slots can be determined as discussed further below.

In addition, although both ends of major axis 54 are between columns of slots in FIG. 2, that position is not required by the present invention. Because of the nearly Gaussian intensity distribution of elliptical laser beam 26A along its major axis 54, elliptical laser beam 26A can be shifted in the direction of the width without significantly affecting the measurements mentioned above. However, small corrections may be needed to compensate for deviations from the ideal Gaussian intensity distribution if the beam is shifted.

Figure 3A:
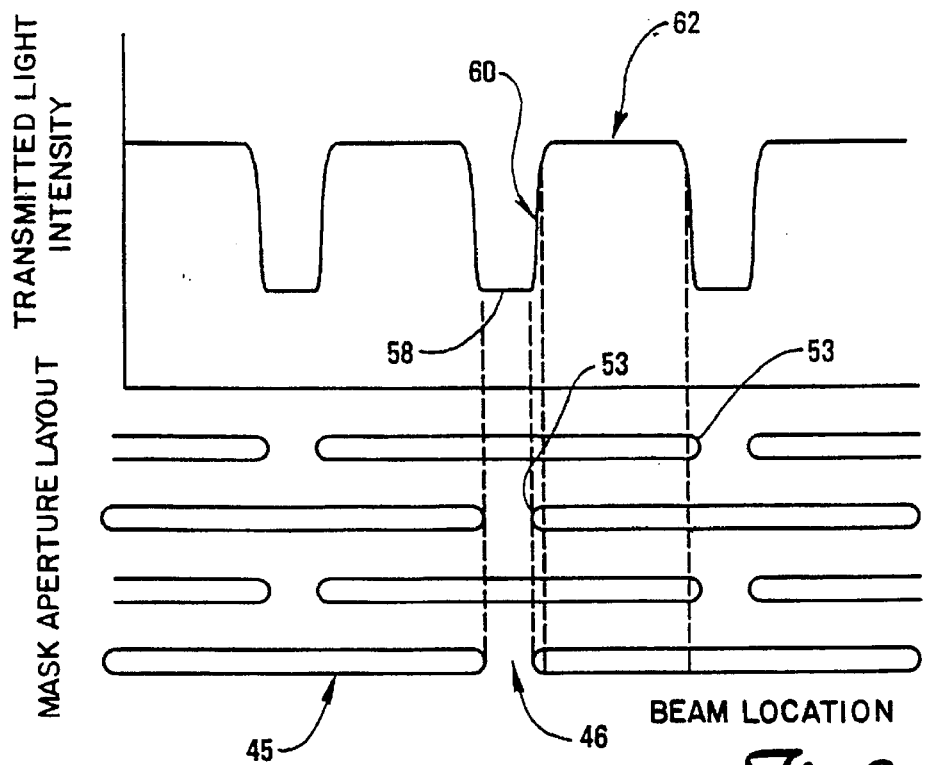
FIG. 3A is a graph of the transmitted light intensity as a shadow mask with slot apertures moves through the elliptical laser beam, the graph is positioned relative to the portion of the shadow mask that created the intensity values.

FIG. 3A is a graph of relative values of the intensity of transmitted beam 28A as shadow mask 22 having slot apertures 45 moves through elliptical laser beam 26A over a given distance. Dotted lines from the graph of the intensity are aligned with the positions of the center of minor axis 56 of elliptical laser beam 26A over shadow mask 22 when the individual intensity values are produced. Major axis 54 is parallel to the widths of the slots as in FIG. 2.

Flat bottom 58 shows a localized minima for the intensity of transmitted beam 28A. Flat bottom 58 is relatively constant for a significant period of time and correlates with the time when elliptical laser beam 26A passes over tie bars 46 of every other column of slots. During this time, elliptical laser beam 26A is only being transmitted through the slots of every other column of slots. Transition 60 starts when elliptical laser beam 26A begins to cross into rounded ends 53 of the slots adjacent to the tie bars. During transition 60, the intensity level of the transmitted light increases as the elliptical beam moves towards the constant width portion of the newly illuminated slots. Once elliptical laser beam 26A has reached the maximum width of the newly illuminated slots, the intensity of the transmitted light becomes relatively constant at flat top 62. Flat top 62 correlates to a time period when elliptical laser beam 26A is passing over a full slot width in each of the columns of slots. The average intensity level remains constant until portions of elliptical laser beam 26A once again move into the rounded ends of a set of slots.

By averaging all of the flat bottom values such as those at flat bottom 58, the average width of all of the slots which elliptical laser beam 26A illuminated over a given distance can be calculated by dividing the value of the average flat bottom intensity of the transmitted light by the average value of the intensity of the reference beam and multiplying the result by twice horizontal pitch 48. This gives the slot width at the center of the illuminated slots.

The same type of calculation can be performed with the average transmitted intensity level of flat top 62. However, after dividing the average flat top intensity level by the average intensity of the reference beam, the result is multiplied by just horizontal pitch 48. This gives the average slot width near the ends of each illuminated slot.

As in the prior art, the average transmittance over an entire slot may be found by integrating the transmitted intensity over time and dividing that result by the integrated intensity of the reference beam over that same time. The result gives a general measure of light transmittance through the mask. The integration is taken over an integral number of periods wherein one period is equal to the time it takes elliptical laser beam 26A to traverse the length of one slot and one tie bar. Integrating over integral numbers of such periods standardizes the measure of transmittance.

In a preferred embodiment, CPU 36 calculates the slot width at the ends and the centers of slots for a number of rows of slots by using average intensity values over a given distance. Although the averaging may mask a problem within one row of slots, it is sufficient for identifying variances in slot width. The advantage of the present invention is that the averaged widths give specific information about the average center width and the average end width instead of just the average total width. Thus, the present invention can detect complex slot deformations which may be missed by less precise measuring instruments. Specifically, the present invention can detect the combination of a narrowed slot center with widened slot ends.

In addition, on a typical shadow mask, different regions of the mask have different horizontal pitches and different slot orientations. Within each region, the pitch and orientation is relatively constant so that the measurements described above can be performed over short distances within each region. Even so, these variations around the shadow mask are one reason for having multiple laser beams. With many beams, the slot width for various regions of the shadow mask may be determined independently from the other regions. CPU 36 performs these width calculations by using the appropriate horizontal pitch for each region's width calculations. Thus, with the present invention, even the slot widths of complex shadow mask patterns may be measured.

Figure 3B:
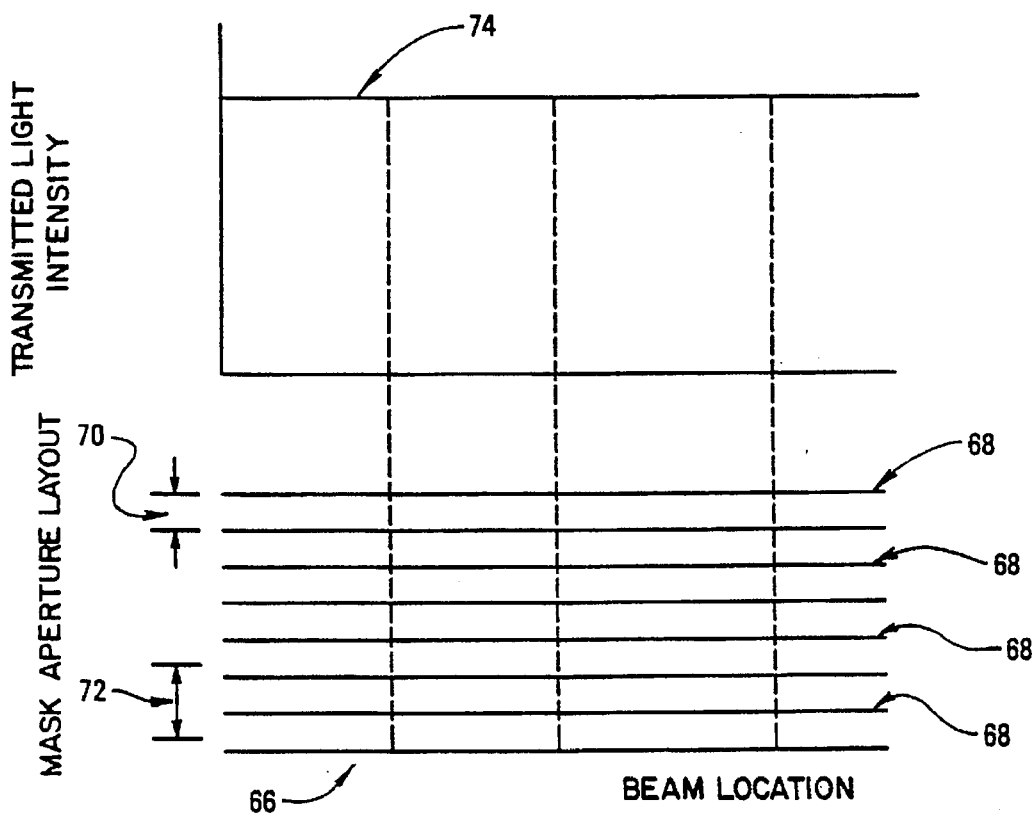
FIG. 3B is a graph of transmitted light intensity as a grill shadow mask moves through the elliptical laser beam, the graph is positioned relative to the portion of the shadow mask that produced the intensity values.

FIG. 3B is a graph of relative values of the intensity of transmitted beam 28A as grill mask 66, a second type of shadow mask with different apertures than shadow mask 22, moves through elliptical laser beam 26A over a given distance. Dotted lines from the graph of the intensity align a specific intensity value with the region on grill mask 66 which produced that value. Grill mask 66 includes columns of apertures 68 similar to those found in shadow mask 22 except without tie bars 46 or rounded ends 53. Columns of apertures 68 each have widths 70 and centers which are separated by a horizontal pitch 72. Elliptical laser beam 26A is positioned over grill mask 66 such that major axis 54 crosses several columns of apertures 68 in the direction of the widths 70. Since grill mask 66 does not have tie bars, the intensity of transmitted beam 28A does not vary as grill mask 66 moves through elliptical laser beam 26A in a direction transverse to widths 70. This constant intensity is shown in FIG. 3B as flat intensity 74. By dividing flat intensity 74 by the intensity of the reference laser beam and multiplying the result by horizontal pitch 72, CPU 36 can determine an average size of widths 70 for the portions of apertures 68 which passed through elliptical laser beam 26A. As with shadow mask 22, multiple elliptical laser beams may be used to find the widths of apertures on other regions of grill mask 66.

Figure 3C:
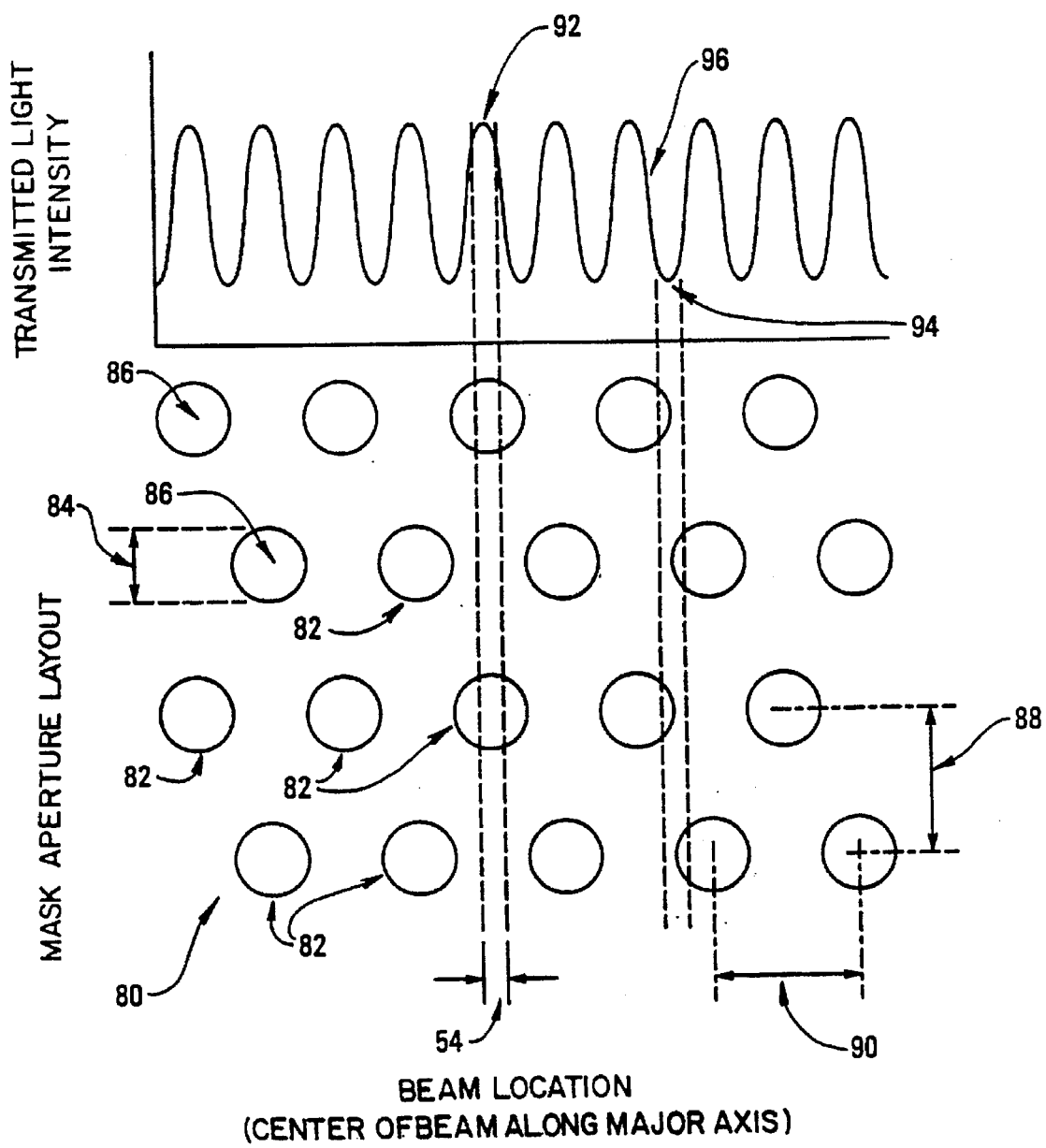
FIG. 3C is a graph of transmitted light intensity as a dot shadow mask moves through the elliptical laser beam, the graph is positioned relative to the portion of the shadow mask that produced the intensity values.

FIG. 3C is a graph of transmitted beam 28A's intensity as a dot mask 80 moves through elliptical laser beam 26A. Dot mask 80 is a third type of shadow mask that has rows and columns of circular apertures 82. Each aperture 82 has a diameter 84 and center 86. The centers of each aperture are separated from the centers of other apertures by a horizontal pitch 88 and a vertical pitch 90. In a preferred embodiment, dot mask 80 moves through elliptical laser beam 26A in the direction of vertical pitch 90 such that vertical pitch 90 is parallel to minor axis 56 and horizontal pitch 88 is parallel to major axis 54.

The intensity levels shown in FIG. 3C are positioned relative to dot mask 80 so that any one intensity level is vertically aligned with the position of the center of minor axis 54 when that intensity level was produced. The vertical dotted lines in FIG. 3C show the edges of elliptical laser beam 26A at two positions over dot mask 80. In one position, elliptical laser beam 26A creates maxima 92 when it is centered on centers 86 of a row of circular apertures. In the other position, elliptical laser beam 26A creates a minima 94 where it is centered between centers 86 of two adjacent rows of circular apertures. Between the maxima and minima of the intensity level are transitions 96.

Maxima 92 does not give a direct measure of diameters 84 because minor axis 54 of elliptical laser beam 26A covers more of the apertures than just a line running through centers 86. However, maxima 92 may be used to calculate the diameter by making assumptions about the basic shape of the apertures. The assumptions about the shape of the apertures may be partially verified by analyzing the shape of transitions 96 which are indicative of the shape of the circular apertures.

Although the present invention has been described in relation to three masks - shadow mask 22, grill mask 60 and dot mask 80 - those skilled in the art will recognize that any sheet with apertures may be used with the present invention to determine characteristics of the apertures.

Figure 4:
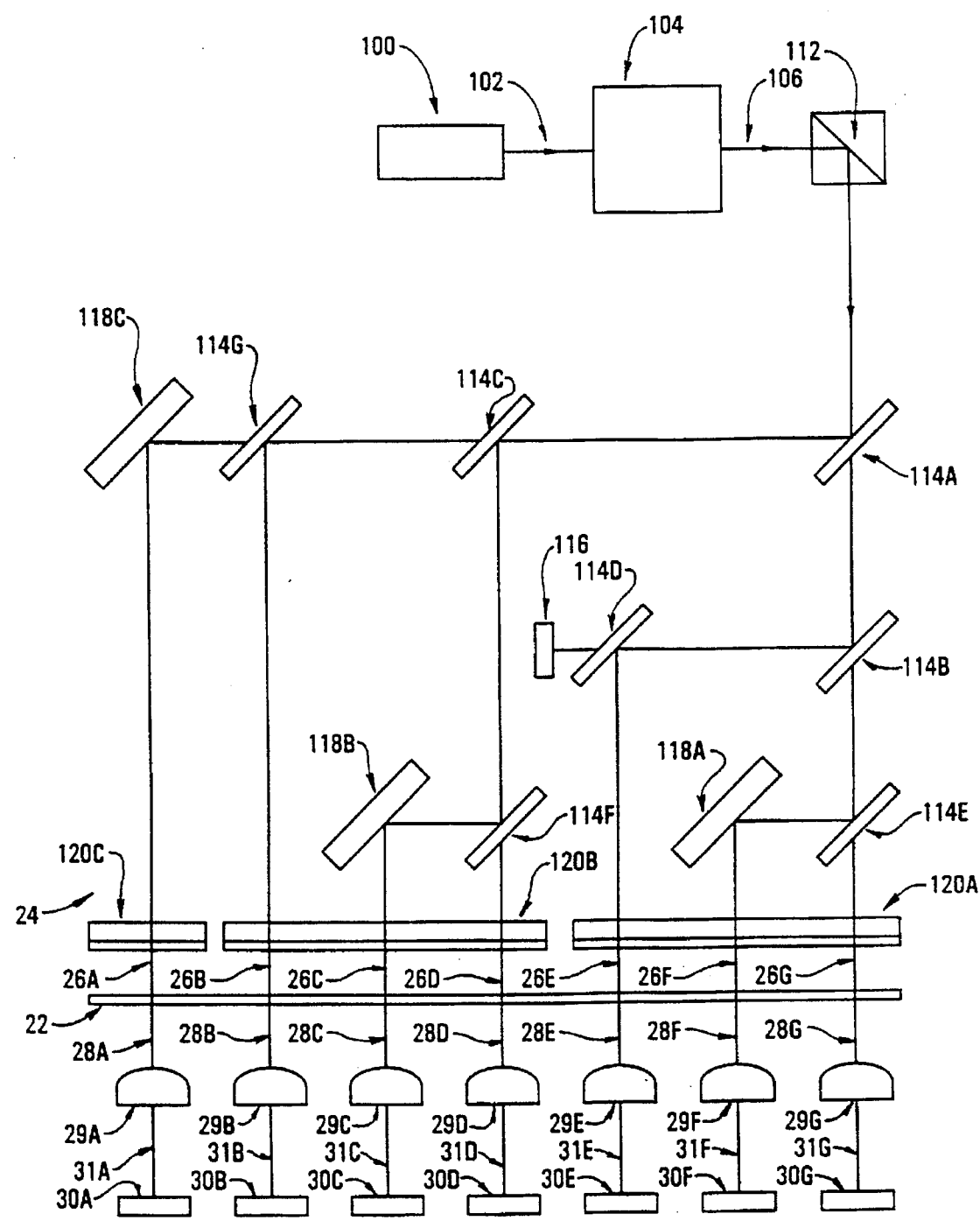
FIG. 4 is a side elevation of the elliptical laser probe system.

FIG. 4 is partial block diagram of elliptical laser 24, shadow mask 22, cylindrical lenses 29A through 29G, and photocells 30A through 30G.

To produce elliptical laser beams 26A through 26G, elliptical laser 24 uses a laser 100 to generate a circular laser beam 102. Laser 100 is preferably a 1.8 mW linearly polarized, 633 nm, He-Ne laser. Circular beam 102 enters beam expanding telescope 104 which expands the circular beam in two directions orthogonal to each other. Although circular laser beam 102 is shown exiting laser 100 and directly entering beam expanding telescope 104, those skilled in the art will recognize that laser 100 can be positioned differently if mirrors are used to guide circular laser beam 102 to beam expanding telescope 104.

Figure 5:
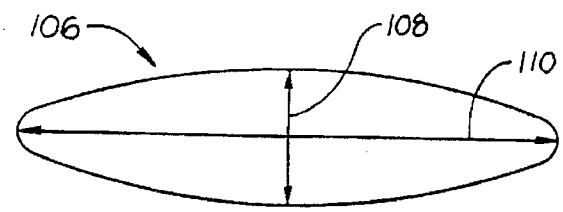
FIG. 5 is a cross-sectional view of elliptical laser beam 73.

In a preferred embodiment, beam expanding telescope 104 creates a beam eight times as large as circular beam 102 in one direction and twice as large as circular beam 102 in the orthogonal direction. The result of this expansion is elliptical laser beam 106, an enlarged cross-section of which is shown in FIG. 5. Elliptical laser beam 106 has minor axis 108 and major axis 110. In the preferred embodiments, major axis 110 is four times as large as minor axis 108. In FIG. 4, minor axis 108 comes out of the page and major axis 110 is in the plane of the figure.

Elliptical laser beam 106 exits beam expanding telescope 104 and is incident upon cube beam splitter 112. Cube beam splitter 112 reflects elliptical laser beam 106 at a 90° angle keeping the minor axis directed out from the page. Elliptical laser beam 106 then encounters beam splitter 114A. Beam splitter 114A is any one of many well known beam splitters in the art, but preferably one which splits elliptical laser beam 106 into two beams of equal intensity. One of the beams continues through beam splitter 114A in a direction parallel to the incident direction of elliptical laser beam 106 towards a second beam splitter 114B. The other beam reflects from beam splitter 114A in a direction orthogonal to the incident direction of elliptical laser beam 106 towards beam splitter 114C. Beam splitters 114B and 114C are preferably identical to beam splitter 114A.

The two beams are split again by beam splitters 114B and 114C respectively. One output beam from beam splitter 114B is split by beam splitter 114D which directs half the beam towards shadow mask 22 and half towards reference photocell 116. Photocell 116 creates a current, representative of the intensity of the incident beam, which it provides to trans-impedance amplifier 32H of FIG. 1. The beam incident on photocell 116 is preferably of the same intensity as elliptical laser beams 26A through 26G as discussed further below. The other output beam from beam splitter 114B is split by beam splitter 114E which sends half of the beam toward shadow mask 22 and half toward mirror 118A. Mirror 118A then reflects this beam towards shadow mask 22.

The output beams of beam splitter 114C are split by beam splitters 114F and 114G respectively. Each of these splitters directs half of the incident beams towards shadow mask 22 and half towards mirrors 118B and 118C respectively. These mirrors reflect their incident beams towards the shadow mask.

This network of beam splitters and mirrors produces eight elliptical laser beams of equal intensity. By the time they reach the shadow mask or reference photocell 116, each beam has encountered three beam splitters and each has approximately one eighth the intensity of elliptical laser beam 106. Thus, the beam incident on reference photocell 116 has approximately the same intensity as each of the seven beams incident on the shadow mask.

Although the invention has been described using eight laser beams for simplicity, thirty-two elliptical laser beams are preferred. The thirty-two beams are produced by two separate elliptical lasers each producing sixteen elliptical laser beams. Two of the elliptical laser beams from each set of sixteen are used as reference beams.

Split elliptical laser beams from mirror 118A and beam splitters 114D and 114E; mirror 118B and beam splitters 114F and 114G; and mirror 118C pass through three cylindrical lenses 120A, 120B, and 120C respectively before impinging shadow mask 22 of FIG. 4. Cylindrical lenses 120A through 120C have no effect on the size of the major axis of the split elliptical laser beams. However, they do cause the minor axis of the split elliptical laser beams to focus to an extremely small length.

Cylindrical lenses 120A, 120B, and 120C produce elliptical laser beams 26E through 26G, 26B through 26D, and 26A respectively which are incident on shadow mask 22. In preferred embodiments, elliptical laser beams 26A through 26G each have a major axis to minor axis ratio of 100 to 1 with the major axis having a length of approximately 5 mm and the minor axis having a length of approximately 0.05 min. As discussed above, this elliptical shape allows the width of the slots to be measured at both the center of the slots and the ends of the slots.

The light from elliptical laser beams 26A, 26B, 26C, 26D, 26E, 26F, and 26G which passes through shadow mask 22 becomes transmitted beams 28A, 28B, 28C, 28D, 28E, 28F, and 28G respectively. Cylindrical lenses 29A; 29B, 29C and 29D; and 29E, 29F and 29G are located opposite cylindrical lenses 120C; 120B; and 120A respectively and redirect light in transmitted beams 28A; 28B, 28C, and 28D; and 28E, 28F, and 28G respectively that diffracted as it passed through the slots in shadow mask 22. Cylindrical lenses 29A, 29B, 29C, 29D, 29E, 29F, and 29G form beams 31A, 31B, 31C, 31D, 31E, 31F, and 31G respectively which are incident upon photocells 30A, 30B, 30C, 30D, 30E, 30F, and 30G respectively, described in FIG. 1.

Those skilled in the art will recognize that the shadow mask must remain vertically stable as it passes through the elliptical laser beams. Vertical shifts in the shadow mask will move the mask out of the focal waist of the elliptical laser beam's minor axis. Rollers may be used before and after the probe to assist in vertically restraining the shadow mask as it moves through the beams. In addition, the plane of the mask should ideally be kept perpendicular to the elliptical laser beam's direction of propagation or a compensation factor should be used to compensate for any skewing of the shadow mask plane from its ideal position.

Figure 6:
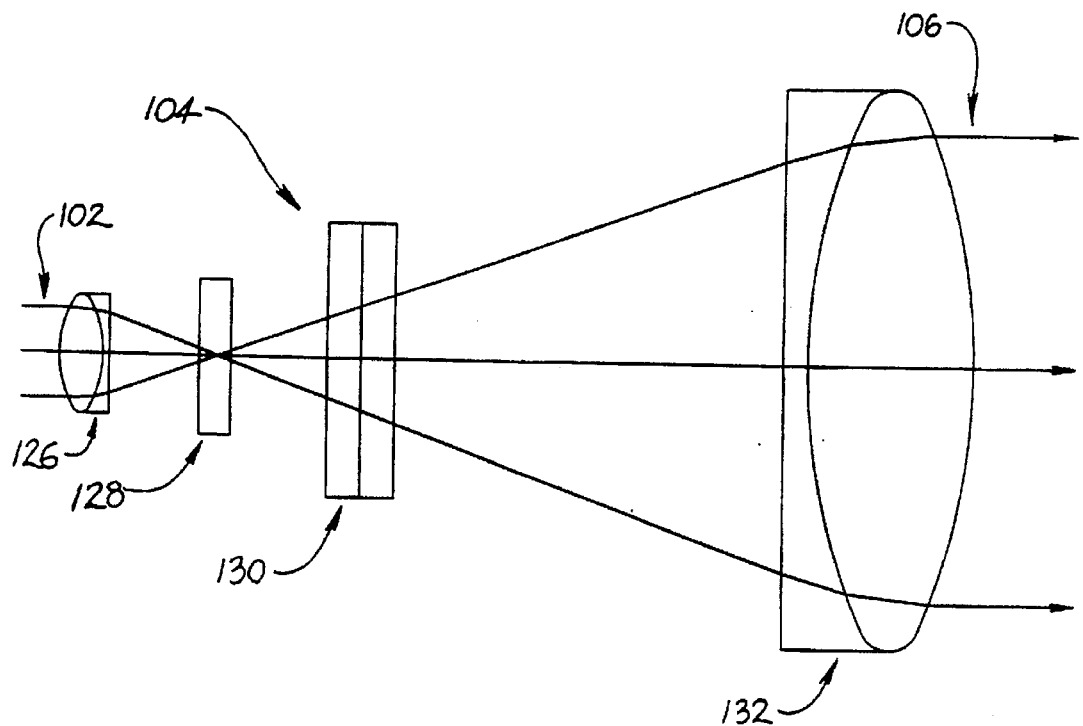
FIG. 6 is a side elevation of one embodiment of beam expanding telescope 72.
Figure 7:
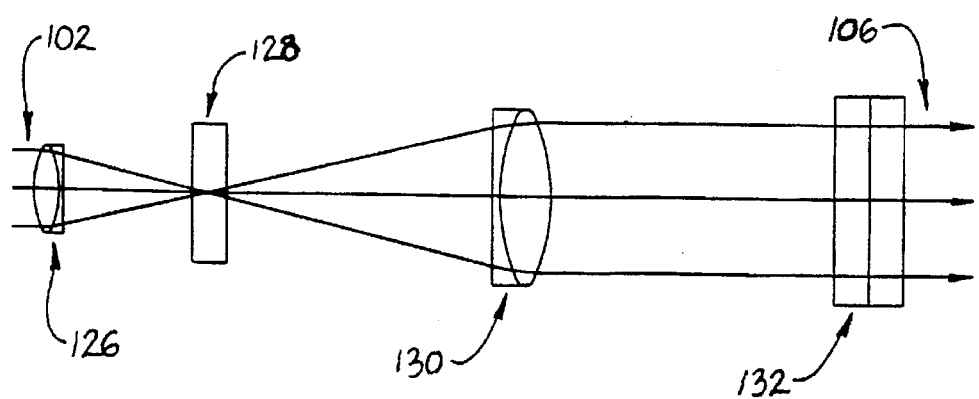
FIG. 7 is a top elevation of the beam expanding telescope of FIG. 6.

FIGS. 6 and 7 show one embodiment of beam expanding telescope 104. FIG. 6 is a side view such as shown in FIG. 4 with the minor axis of the beams coming out of the page and the major axis shown vertically in the plane of the figure. FIG. 7 is a top view, with the major axis coming out of the page and the minor axis shown vertically in the plane of the figure.

In FIGS. 6 and 7, circular laser beam 102 enters from laser 100 into achromatic lens 126 which is a spherical lens with a focal length of 15 min. Because it is spherical, achromatic lens 126 causes both the major axis and the minor axis of circular laser beam 102 to converge to a beam size of 20 micrometers, 15 mm from the lens.

At the focal plane of achromatic lens 126, approximately 15 mm from achromatic lens 126, is pin hole assembly 128. Pin hole assembly 128 preferably has a circular opening with a 40 micrometer diameter. Pin hole assembly 128 removes unwanted light from the perimeter of circular laser beam 102. The laser light from pin hole assembly 128 diverges in an approximately conical manner towards compound cylindrical lens 130 which is 30 mm away from pin hole assembly 128. As shown in FIG. 7, compound cylindrical lens 130 has a focal length of 30 mm and therefore collimates the laser light incident on it so that the beam no longer expands in the direction of the minor axis. At the point where compound cylindrical lens 130 collimates the laser light, the width of the beam along the minor axis is twice as large as it was in circular laser beam 102. As shown in FIG. 6, compound cylindrical lens 130 does not affect the divergence of the laser light in the direction of the major axis.

The laser light continues to expand in the direction of the major axis until it encounters compound cylindrical lens 132 shown in FIGS. 6 and 7. Compound cylindrical lens 132 has a focal length of 120 mm and is located approximately 120 mm from pinhole assembly 128. Thus, as shown in FIG. 6, compound cylindrical lens 132 collimates the laser light so that it no longer diverges in the direction of the major axis. However, it has no effect on the laser light in the direction of the minor axis as shown in FIG. 7. The laser light continues to be collimated along the minor axis as it passes through compound cylindrical lens 132.

Compound cylindrical lens 132 is positioned such that the major axis length of the cross-sectional area of the laser light exiting the lens is eight times as large as it is in circular laser beam 102. Since the length of the laser light along the minor axis is twice as large as it is in circular laser beam 102, the beam exiting beam expanding telescope 104 of FIGS. 6 and 7 has a major axis to minor axis ratio of 4 to 1.

Figure 8:
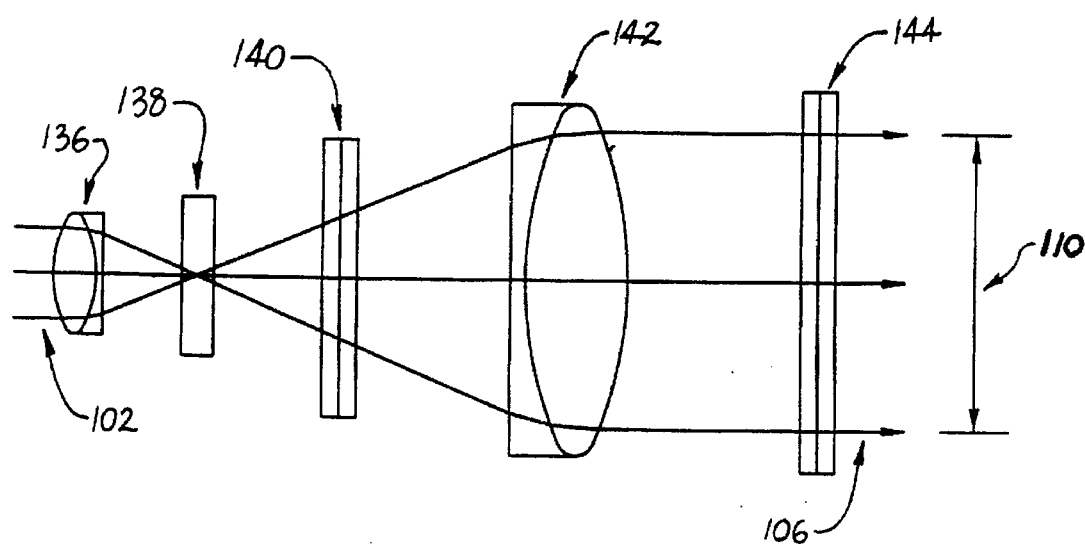
FIG. 8 is a side elevation of a second embodiment of beam expanding telescope 72.
Figure 9:
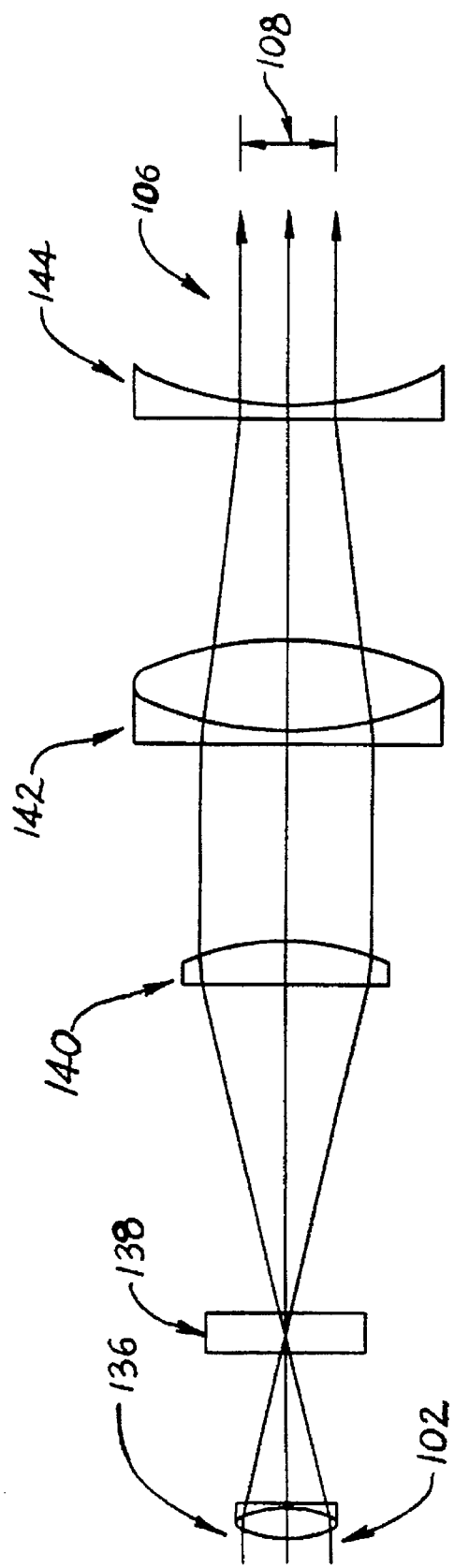
FIG. 9 is a top elevation of the beam expanding telescope of FIG. 8.

FIGS. 8 and 9 disclose a second embodiment of beam expanding telescope 104. FIG. 8 shows the beam expanding telescope in the same direction as shown in FIG. 4. FIG. 9 shows the beam expanding telescope from a top view.

FIG. 8 shows the expansion of circular laser beam 102 along the direction of the major axis. An achromatic lens 136 with a focal length of 15 mm focuses the light in circular laser beam 102 on a circular hole found in pin hole assembly 138 approximately 15 mm away. The circular hole is about 40 micrometers in diameter and filters out unwanted light around the perimeter of the beam. The laser light diverges from pin hole assembly 138 in an approximately conical manner and is incident on cylindrical lens 140 located 60 mm away. As shown in FIG. 8, cylindrical lens 140 does not affect the divergence of the light along the major axis. However, cylindrical lens 140, which has a focal length of +60 ram, does collimate the laser light so that it no longer diverges along the minor axis. This collimation is shown in FIG. 9 and results in a beam with a minor axis which is four times as large as the minor axis found in circular laser beam 102.

From cylindrical lens 140, the laser light travels to achromatic lens 142 located 120 mm from pin hole assembly 138. Achromatic lens 142 is a spherical lens with a focal length of 120 mm which refracts the laser light along both the major axis and the minor axis. The focal point of achromatic lens 142 is such that the light diverging along the major axis is collimated so it no longer diverges or converges along the major axis. In addition, achromatic lens 142 causes the light which is collimated along the minor axis to converge towards a point 120 mm forward from the lens.

Approximately 60 mm from achromatic lens 142, the laser light is incident on negative cylindrical lens 144. Negative cylindrical lens 144 has no effect on the light along the major axis and thus the light continues to be collimated along that axis. The length of the laser light's major axis as it exits negative cylindrical lens 144 is eight times as large as the major axis in circular laser beam 102.

Negative cylindrical lens 144 has a focal length of–60 mm. Because of this, negative cylindrical lens 144 collimates the laser light along the minor axis after it has converged to a minor axis length twice that of the minor axis length found in circular laser beam 102. Thus, the ratio of the beam's major axis to the beam's minor axis as it exits negative cylindrical lens 144 is 4 to 1 and the light is collimated both along the major axis and along the minor axis.

By creating an elliptical laser beam with a major axis to minor axis ratio of 100 to 1, the present invention provides a means to measure the widths of select portions of apertures in a shadow mask without sweeping a laser beam across the shadow mask.

Although the present invention has been described with reference to preferred embodiments, workers skilled in the art will recognize that changes may be made in form and detail without departing from the spirit and scope of the invention.

What is claimed is:

1. A laser probe system for measuring attributes of a sheet of material having apertures, the apertures each having widths in the direction of a first aperture axis and lengths in the direction of a second aperture axis, the first and second aperture axes orthogonal to each other, the apertures aligned in a plurality of columns along the direction of the second aperture axis, each column separated by a pitch distance, the laser probe system comprising:

at least one probe laser beam incident on a first side of the sheet, each probe laser beam having a primary direction of propagation, a major axis in the direction of the first aperture axis and a minor axis in the direction of the second aperture axis, the major axis and minor axis normal to each other and normal to the primary direction of propagation of the probe laser beam, the major axis being larger than the sum of the width of an aperture and the pitch distance, the minor axis being smaller than the length of an aperture;

a receiving system, positioned on the second side of the sheet, the receiving system creating a detector signal representative of the amount of light passing through the apertures in the sheet; and means for calculating an attribute of the sheet, the means for calculating being coupled to the receiving system and capable of calculating the attribute of the sheet from the detector signal produced by the receiving system.

2. The laser probe system of claim 1 wherein the major axis is at least twice as large as the pitch distance and the minor axis is smaller than half the length of one aperture.

3. The laser probe system of claim 2 wherein the attributes capable of being calculated by the means for calculating include widths of the apertures near the ends of the apertures, widths of the apertures near the centers of the apertures, and average light transmittance for the entire length of at least one aperture.

4. The laser probe system of claim 3 wherein the sheet of material having apertures is capable of moving relative to the laser probe system in a plane normal to the primary direction of propagation of at least one probe laser beam.

5. The laser probe system of claim 4 wherein the means for calculating comprises:

means for identifying maxima of the detector signal which have a constant value for more than an infinitesimally small time period; and means for calculating widths of apertures at the ends of the apertures by using value of at least one of the maxima of the detector signal.

6. The laser probe system of claim 5 wherein the means for calculating further comprises:

means for determining an average value from at least one of the maxima values;

means for dividing the average value by a value representative of the amount of light incident on the sheet, the division producing a result; and means for multiplying the result by the pitch distance, the multiplication producing a measure of widths of apertures near the ends of apertures in the sheet of material.

7. The laser probe system of claim 6 wherein the laser probe system further comprises:

multiple laser beams, each identical to the probe laser beam and each incident on separate regions of the sheet of material, each laser beam capable of producing a separate detector signal and the means for calculating an attribute capable of producing a separate measure of widths of apertures near the ends of apertures in the sheet of material from each separate detector signal.

8. The laser probe system of claim 4 wherein the means for calculating attributes comprises:

means for identifying minima of the detector signal which have a constant value for more than an infinitesimally small time period; and means for calculating widths at the centers of the apertures by using the value of at least one of the minima of the detector signal.

9. The laser probe system of claim 8 wherein the means for calculating attributes further comprises:

means for determining an average value from at least one of the minima values;

means for dividing the average value by a value representative of the amount of light incident on the sheet, the division producing a result; and means for multiplying the result by twice the pitch distance.

10. The laser probe system of claim 9 wherein the laser probe system further comprises:

multiple laser beams, each identical to the probe laser beam and each incident on separate regions of the sheet of material, each laser beam capable of producing a separate detector signal and the means for calculating an attribute capable of producing a separate measure of widths of apertures near the center of apertures in the sheet of material from each separate detector signal.

11. The laser probe system of claim 4 wherein the means for calculating an attribute comprises:

means for integrating the detector signal over a first time period, the integration producing an integrated detector signal;

means for integrating a reference signal representative of the amount of light incident on the sheet over the first time period, the integration producing an integrated reference signal;

means for dividing the integrated detector signal by the integrated reference signal to produce the average light transmittance.

12. The laser probe system of claim 1 wherein the probe laser beam has a spatial intensity distribution along its major axis and a major axis length such that only relative movement between the sheet and the probe laser beam in the direction of the minor axis significantly changes the amount of light passing through the sheet.

13. The laser probe system of claim 1 wherein the apertures include column apertures, each column aperture having at least one width, each width in the direction of at least one probe laser beam's major axis.

14. The laser probe system of claim 13 wherein the means for calculating an attribute is capable of calculating the size of widths of column apertures.

15. The laser probe of claim 1 wherein the apertures include circular apertures, each circular aperture having a diameter.

16. A method for measuring widths of slots in a moving web, the moving web having columns of slots with centers, the center of each column of slots being separated from centers of other columns of slots by a horizontal pitch distance, the method comprising:

projecting a stationary light toward the moving web, the light illuminating only a portion of the web at any one time;

detecting the amount of light transmitted through the web;

creating an electrical signal based on the detected light;

identifying portions of the electrical signal which are substantially constant for a period of time, each substantially constant portion having a value; and using the value of the substantially constant portions of the electrical signal to calculate average widths of select areas of the slots through which the light passed.

17. The method of claim 16 wherein the average widths near the ends of the slots are calculated by:

identifying substantially constant maxima of the electrical signal, each maxima having a value;

dividing the value of one of the identified maxima by a value representative of the total light incident on the web to obtain a result; and multiplying the result by the horizontal pitch distance.

18. The method of claim 16 wherein the widths at the centers of the slots are calculated by:

identifying substantially constant minima of the electrical signal, each minima having a value;

dividing the value of one of the identified minima by a value representative of the total light incident on the web to obtain a result; and multiplying the result by twice the horizontal pitch distance.

19. A method for measuring attributes of a sheet of material having apertures, the apertures each having widths in a first aperture direction and lengths in a second aperture direction, the first and second aperture directions orthogonal to each other, the apertures aligned in relative columns along the second aperture direction, each column separated by a horizontal pitch distance in the first aperture direction, the method comprising:

projecting at least one probe laser beam on a first side of the sheet of material, each probe laser beam having a primary direction of propagation, a major axis along the first aperture direction and a minor axis along the second aperture direction, the major axis and minor axis normal to each other and normal to the primary direction of propagation of the probe laser beam, the major axis being larger than the sum of the width of an aperture and the horizontal pitch distance, the minor axis being smaller than the length of an aperture;

detecting the amount of light passing through the apertures in the sheet of material;

creating a detector signal based on the amount of detected light;

calculating from the detector signal at least one attribute of the
sheet of material.

20. The method of claim 19 wherein calculating at least one attribute of the sheet of material comprises:

identifying maxima of the detector signal, each maxima having a value; and calculating a dimension of at least one aperture using the value of at least one maxima.

21. The method of claim 19 wherein calculating at least one attribute of the sheet of material comprises:

identifying minima of the detector signal, each minima having a value; and calculating a dimension of at least one aperture using the value of at least one minima.

* * * * *

UNITED STATES PATENT AND TRADEMARK OFFICE
CERTIFICATE OF CORRECTION

PATENT NO. : 5,636,029

DATED : JUNE 3, 1997

INVENTOR(S) : BRUCE H. ZIMMERMAN, JAMES R. FENDLEY

It is certified that error appears in the above-indentified patent and that said Letters Patent is hereby corrected as shown below:

Col. 8, line 50, delete "min.", insert --mm--

Col. 9, line 19, delete "min.", insert --mm--

Col. 10, line 9, delete "ram", insert --mm--

Signed and Sealed this

Fourth Day of November, 1997

BRUCE LEHMAN

*Attest:*

*Attesting Officer*  *Commissioner of Patents and Trademarks*